United States Patent
Kollar et al.

(10) Patent No.: US 11,943,799 B2
(45) Date of Patent: *Mar. 26, 2024

(54) EVALUATION OF DL IP SCHEDULED THROUGHPUT FOR INTER ENB CARRIER AGGREGATION

(71) Applicant: NOKIA TECHNOLOGIES OY, Espoo (FI)

(72) Inventors: Martin Kollar, Kosice (SK);
Malgorzata Tomala, Wroclaw (PL);
Arkadiusz Zieba, Gdansk (PL)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/059,414

(22) Filed: Nov. 28, 2022

(65) Prior Publication Data

US 2023/0085881 A1    Mar. 23, 2023

Related U.S. Application Data

(63) Continuation of application No. 17/045,461, filed as application No. PCT/EP2018/058811 on Apr. 6, 2018, now Pat. No. 11,523,407.

(51) Int. Cl.
*H04W 72/542* (2023.01)
*H04W 24/08* (2009.01)
*H04W 72/0453* (2023.01)

(52) U.S. Cl.
CPC ......... *H04W 72/542* (2023.01); *H04W 24/08* (2013.01); *H04W 72/0453* (2013.01)

(58) Field of Classification Search
None
See application file for complete search history.

(56) References Cited

U.S. PATENT DOCUMENTS 11,523,407 B2 * 12/2022 Kollar .................. H04W 24/08
2016/0029233 A1 * 1/2016 Kollar ................. H04L 43/0888
370/252

FOREIGN PATENT DOCUMENTS

CN        1596527 A      3/2005
CN      101578842 A     11/2009
(Continued)

OTHER PUBLICATIONS

"3rd Generation Partnership Project; Technical Specification Group Radio Access Network; Evolved Universal Terrestrial Radio Access (E-UTRA); Layer 2—Measurements (Release 14)", 3GPP TS 36.314, V14.0.0, Mar. 2017, pp. 1-23.

(Continued)

*Primary Examiner* — Saad Khawar
(74) *Attorney, Agent, or Firm* — Brake Hughes Bellermann LLP (57) ABSTRACT

Method, comprising determining sizes of first and second data received at PCell for transmission to UE and of secondary parts of the first and second data transmitted from PCell to SCell for transmission to UE; deciding first and second initial times of the transmission of the respective data; deciding first and second primary final times indicating an end of transmission of the respective primary parts; monitoring an indication of a throughput of SCell; obtaining a transmission delay from PCell to SCell; estimating first and second secondary final times based on transmission delay, size of the respective secondary part, and the throughput; identifying first and second latest final times among the respective primary and secondary final times; calculating first and second throughputs of the transmission of the respective data based on the size of the respective data and a respective duration between the respective initial time and latest final time.

12 Claims, 5 Drawing Sheets

(56) References Cited

FOREIGN PATENT DOCUMENTS

| CN | 103546908 A | 1/2014 |
|---|---|---|
| EP | 2688334 A2 | 1/2014 |
| WO | 2014/135216 A1 | 9/2014 |

OTHER PUBLICATIONS

Zheng, "UL CoMP Scheduling Implementation in UL Uprise", Thesis, 2011, 8 pages.
"Transmission Time", Wikipedia, Retrieved on Oct. 8, 2020, Webpage available at: https://en.wikipedia.org/wiki/Transmission_time.
International Search Report and Written Opinion received for corresponding Patent Cooperation Treaty Application No. PCT/EP2018/058811, dated Dec. 10, 2018, 16 pages.
"3rd Generation Partnership Project; Technical Specification Group Radio Access Network; Evolved Universal Terrestrial Radio Access (E-UTRA); Layer 2—Measurements (Release 11 )", 3GPP TS 36.314, V11.1.0, Dec. 2012, pp. 1-20.
"Throughput measurement for Carrier Aggregation", 3GPP TSG-RAN WG2 Meeting #93, R2-161645, Agenda: 6.1.1, Nokia Networks, Feb. 15-19, 2016, 5 pages.
Office action received for corresponding European Patent Application No. 18717012.1, dated Jun. 15, 2022, 5 pages.
Office Action and Search Report for Chinese Patent Application No. 201880094220.1, dated Feb. 7, 2024, 6 pages.
Zhang et al.; "Analysis of the Throughput of HARQ in Satellite Communication System"; Journal of Military Communications Technology; vol. 32, No. 2; Jun. 2011; 7 pages.

\* cited by examiner

EVALUATION OF DL IP SCHEDULED THROUGHPUT FOR INTER ENB CARRIER AGGREGATION

RELATED APPLICATIONS

This is a continuation patent application of U.S. application Ser. No. 17/045,461, filed Oct. 5, 2020, entitled "Evaluation of DL IP Scheduled Throughput for inter eNB Carrier Aggregation" which is a national stage entry of International Application No. PCT/EP2018/058811, filed Apr. 6, 2018, both of which are hereby incorporated by reference in their entireties.

FIELD OF THE INVENTION

The present invention relates to an apparatus, a method, and a computer program product related to evaluation of performance of carrier aggregation.

ABBREVIATIONS

3GPP 3rd Generation Partnership Project
ACK acknowledgement
CA Carrier Aggregation
CC Component Carrier
DL downlink
eNB evolved NodeB
E-RAB Evolved RAB
E-UTRAN Evolved UTRAN
Gbps Gigabits per second
gNB NodeB of NR
HARQ hybrid automatic repeat request
IP Internet Protocol
LTE Long Term 3GPP Evolution
MAC Medium Access Control
Mbps Megabits per second
NAS Non-access stratum
NR New Radio
PCell Primary Serving Cell
PDCP Packet Data Convergence Protocol
PDU Protocol Data Unit
PHY Physical Layer
PM Performance Management
QCI QoS class identifier
QoS Quality of Service
RAB Radio Access Bearer
RLC Radio Link Control
RRC Radio Resource Control
RTT Round trip time
SAP Service Access Point
SCell Secondary Serving Cell
SDU Service Data Unit
SI System Information
TS Technical Specification
TTI Transmission Time Interval
UE User Equipment
X2 interface between base stations (e.g., eNB, gNB)

BACKGROUND OF THE INVENTION

LTE advanced aims to support peak data rates of 1 Gbps in the downlink and 500 Mbps in the uplink. In order to fulfill such requirements, a transmission bandwidth of up to 100 MHz is required; however, since the availability of such large portions of contiguous spectrum is rare in practice, LTE-Advanced uses carrier aggregation of multiple Component Carriers (CCs) to achieve high-bandwidth transmission. LTE-advanced supports aggregation of up to five 20 MHz CCs.

All CCs in Release 10 are designed to be backward-compatible. This means that it is possible to configure each CC such that it is fully accessible to Release 8 User Equipments (UEs). From the higher-layer perspective, each CC appears as a separate cell with its own Cell ID. A UE that is configured for carrier aggregation connects to Primary Serving Cell (known as the "PCell") and up to four Secondary Serving Cells (known as "SCells"). The PCell is defined as the cell that is initially configured during connection establishment; it plays an essential role with respect to security, NAS mobility information, SI for configured cells, and some lower layer functions.

After the initial security activation procedure, E-UTRAN may configure a UE supporting carrier aggregation with one or more SCells in addition to the PCell that is initially configured during connection establishment. The configured set of serving cells for a UE always contains one PCell and may also contain one or more SCells. The number of serving cells that can be configured depends on the aggregation capability of a UE. A single Radio Resource Control (RRC) connection is established with the PCell, which controls all the CCs configured for a UE. Thanks to a new functionality, now UE is able to connect to SCells that are even from different eNBs, but still the PCell connection must remain in the eNB from which UE originates, where UE has established default bearer connection. The communication between PCell and SCells in terms of Inter eNB Carrier Aggregation shall take place over X2 interface.

After RRC Connection establishment to the PCell, reconfiguration, addition and removal of SCells can be performed by RRC. When adding a new SCell, dedicated RRC signaling is used to send all the required SI for the new SCell. While in connected mode, changes of SI for an SCell are handled by release and addition of the affected SCell, and this may be done with a single RRC reconfiguration message.

The nomenclature is as follows: Packets received by a layer (from a higher layer) are called SDU, packets output from a layer (to a lower layer) are called PDU. The layers relevant in the present context are PHY-MAC-RLC-PDCP-IP in sequence from bottom to up.

SUMMARY OF THE INVENTION

It is an object of the present invention to improve the prior art.

According to a first aspect of the invention, there is provided an apparatus, comprising
means for determining configured to determine:
a size of a first data volume received at a primary cell and to be transmitted to a terminal;
a size of a secondary part of the first data volume transmitted on a link from the primary cell to a secondary cell for transmission to the terminal;
a size of a second data volume received at the primary cell and to be transmitted to the terminal, wherein the second data volume is different from the first data volume;
a size of a secondary part of the second data volume transmitted on the link from the primary cell to the secondary cell for transmission to the terminal;
means for deciding configured to decide:
a first initial point in time when the transmission of the first data volume to the terminal starts based on a start of a transmission of a primary part of the first data volume from the primary cell to the terminal, a second initial point in time when the transmission of the second data volume to the terminal starts based on a start of a transmission of a primary part of the second data volume from the primary cell to the terminal, a first primary final point in time based on an end of the transmission of the primary part of the first data volume from the primary cell to the terminal, and a second primary final point in time based on an end of the transmission of the primary part of the second data volume from the primary cell to the terminal;

means for monitoring configured to monitor if an indication of a scheduled throughput of the secondary cell is received;

means for obtaining configured to obtain a link transmission delay on the link from the primary cell to the secondary cell;

means for estimating configured to estimate:
a first secondary final point in time based on the first initial point in time, the link transmission delay, the size of the secondary part of the first data volume, and the indication of the scheduled throughput, and a second secondary final point in time based on the second initial point in time, the link transmission delay, the size of the secondary part of the second data volume, and the indication of the scheduled throughput;

means for comparing configured to compare:
the first primary final point of time with the first secondary final point in time to identify a first latest final point in time among the first primary and secondary final points in time, and the second primary final point of time with the second secondary final point in time to identify a second latest final point in time among the second primary and secondary final points in time;

means for calculating configured to calculate:
a first throughput of the transmission of the first data volume to the terminal based on the size of the first data volume and a first time duration between the first initial point in time and the first latest final point in time, and a second throughput of the transmission of the second data volume to the terminal based on the size of the second data volume and a second time duration between the second initial point in time and the second latest final point in time.

For at least one of the first data volume and the second data volume, the means for calculating may be configured to calculate the respective throughput by dividing the size of the respective data volume by the respective time duration.

For at least one of the first data volume and the second data volume, the means for estimating may be configured to estimate the respective secondary final point in time by determining a respective secondary transmission duration by dividing the size of the secondary part of the respective data volume by the scheduled throughput; and adding the respective secondary transmission duration and the link transmission delay to the respective initial point in time.

The means for determining may be configured to decide a respective size of each of one or more secondary parts of the first data volume, wherein each of the one or more secondary parts of the first data volume is transmitted on a respective link from the primary cell to a respective secondary cell for transmission to the terminal; the means for obtaining may be configured to obtain a respective link transmission delay on each of the links from the primary cell to the secondary cells; the means for monitoring may be configured to monitor if a respective indication of a scheduled throughput of each of the secondary cells is received; the means for estimating may be configured to estimate a respective first secondary final point in time for each of the secondary cells, based on the first initial point in time, the respective link transmission delay, the size of the respective secondary part of the first data volume, and the respective indication of the scheduled throughput; the means for comparing may be configured to compare the first primary final point of time and the first secondary final points in time in order to identify the first latest final point in time among the first primary and secondary final points in time; wherein the first data volume may consist of the primary part of the first data volume and the one or more secondary parts of the first data volume.

The means for determining may be configured to decide a respective size of each of one or more secondary parts of the second data volume, wherein each of the one or more secondary parts of the second data volume is transmitted on a respective link from the primary cell to a respective secondary cell for transmission to the terminal; the means for obtaining may be configured to obtain a respective link transmission delay on each of the links from the primary cell to the secondary cells; the means for monitoring may be configured to monitor if a respective indication of a scheduled throughput of each of the secondary cells is received; the means for estimating may be configured to estimate a respective second secondary final point in time for each of the secondary cells, based on the second initial point in time, the respective link transmission delay, the size of the respective secondary part of the second data volume, and the respective indication of the scheduled throughput; the means for comparing may be configured to compare the second primary final point of time and the second secondary final points in time in order to identify the second latest final point in time among the second primary and secondary final points in time; wherein the second data volume may consist of the primary part of the second data volume and the one or more secondary parts of the second data volume.

According to a second aspect of the invention, there is provided an apparatus comprising means for obtaining configured to obtain a measured scheduled throughput of a scheduling of a transmission of a data volume from a secondary cell to a terminal, wherein the measured scheduled throughput is related to the transmission of only the data volume, and the data volume is received by the secondary cell from a primary cell for the transmission to the terminal; means for providing configured to provide an indication of an indicated scheduled throughput to the primary cell, wherein the indicated scheduled throughput is based on the measured scheduled throughput.

The apparatus may further comprise means for averaging configured to average plural measured scheduled throughputs obtained over a predefined period of time in order to obtain the indicated scheduled throughput.

The indicated scheduled throughput may be equal to the measured scheduled throughput.

According to a third aspect of the invention, there is provided a method, comprising determining a size of a first data volume received at a primary cell and to be transmitted to a terminal; determining a size of a secondary part of the first data volume transmitted on a link from the primary cell to a secondary cell for transmission to the terminal; determining a size of a second data volume received at the primary cell and to be transmitted to the terminal, wherein the second data volume is different from the first data volume; determining a size of a secondary part of the second data volume transmitted on the link from the primary cell to the secondary cell for transmission to the terminal; deciding a first initial point in time when the transmission of the first data volume to the terminal starts based on a start of a transmission of a primary part of the first data volume from the primary cell to the terminal, deciding a second initial point in time when the transmission of the second data volume to the terminal starts based on a start of a transmission of a primary part of the second data volume from the primary cell to the terminal, deciding a first primary final point in time based on an end of the transmission of the primary part of the first data volume from the primary cell to the terminal, deciding a second primary final point in time based on an end of the transmission of the primary part of the second data volume from the primary cell to the terminal; monitoring if an indication of a scheduled throughput of the secondary cell is received; obtaining a link transmission delay on the link from the primary cell to the secondary cell; estimating a first secondary final point in time based on the first initial point in time, the link transmission delay, the size of the secondary part of the first data volume, and the indication of the scheduled throughput, estimating a second secondary final point in time based on the second initial point in time, the link transmission delay, the size of the secondary part of the second data volume, and the indication of the scheduled throughput; comparing the first primary final point of time with the first secondary final point in time to identify a first latest final point in time among the first primary and secondary final points in time, comparing the second primary final point of time with the second secondary final point in time to identify a second latest final point in time among the second primary and secondary final points in time; calculating a first throughput of the transmission of the first data volume to the terminal based on the size of the first data volume and a first time duration between the first initial point in time and the first latest final point in time, and calculating a second throughput of the transmission of the second data volume to the terminal based on the size of the second data volume and a second time duration between the second initial point in time and the second latest final point in time.

According to a fourth aspect of the invention, there is provided a method, comprising obtaining a measured scheduled throughput of a scheduling of a transmission of a data volume from a secondary cell to a terminal, wherein the measured scheduled throughput is related to the transmission of only the data volume, and the data volume is received by the secondary cell from a primary cell for the transmission to the terminal; providing an indication of an indicated scheduled throughput to the primary cell, wherein the indicated scheduled throughput is based on the measured scheduled throughput.

Each of the methods of the third and fourth aspects may be a method of determining throughput.

According to a fifth aspect of the invention, there is provided a computer program product comprising a set of instructions which, when executed on an apparatus, is configured to cause the apparatus to carry out the method according to any of the third and fourth aspects. The computer program product may be embodied as a computer-readable medium or directly loadable into a computer.

According to some embodiments of the invention, at least one of the following advantages may be achieved:

DL IP scheduled throughput may be determined for inter-base station carrier aggregation;
new measurement types are not required;
additional load on X2 link is very small;
additional load on X2 link may be adapted by adapting the reporting interval;
calculation load may be on PCell or distributed between PCell and SCell;
the logic of 3GPP TS 36.314 is maintained.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Currently, 3GPP (in particular 3GPP TS 36.314) does not define at all how such Inter eNB CA Throughput should be measured.

In an implementation example of Inter eNB CA, data on PDCP layer are divided between PCell and SCell(s). PDCP PDUs are sent over X2 interface from PCell to SCell. From PDCP perspective the data transmission, which happens on specific cell scheduler, whether it is PCell or SCell(s), is unknown.

It is considered to measure IP Scheduled Throughput based on PDCP SDUs. An obstacle in performing such measurement is to define a way where PDCP data volume has been properly scheduled and transmitted to the CA user, from SCell(s) perspective. As SCell scheduler is on different eNB than PCell (for inter eNB CA), this is not a trivial task. Typically, on PCell this is currently done in such a way that each PDCP SDU is being verified for being transmitted based on HARQ ACK confirmation from MAC layer.

One solution was proposed to create neighbour relation counters between cells from different eNBs, and to measure over each cell the portion of PCell data volume traffic and SCell data volume traffic, separately, done for this cell. Such solution would require a lot of counter instances to be created (up to 12 possible relations for a given cell) and a lot of effort in implementation on lower layers. There was also an assumption that it could greatly decrease the performance of eNB and thus, the solution was rejected.

Figure 1:
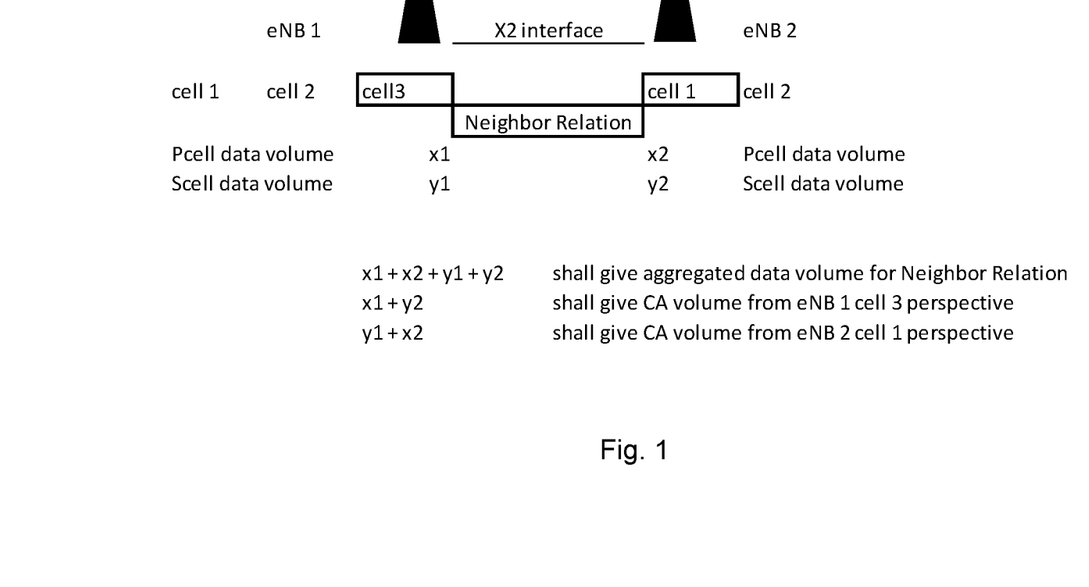
FIG. 1 shows a rejected idea of IP throughput calculation based on neighbor relation.

The general idea of this solution, which is based on neighbour relation, can be seen in FIG. 1, where x1 and y1 represent PCell data volume and SCell data volume, respectively, transmitted via cell 3 on eNB1. Correspondingly, x2 and y2 represent PCell data volume and SCell data volume, respectively, transmitted via cell 1 on eNB2. So the total sum of x1, x2, y1 and y2 divided by the total time when CA data are sent from cell 3 on eNB1 and from cell 1 from eNB2 would directly tell us about IP scheduled throughput obtained from certain neighbour relation between eNB1's cell 3 and eNB2's cell 1, driven in 3GPP TS 36.314. It is also possible, based on this idea, to calculate CA IP scheduled throughput from certain cell perspective, e.g., x1+y2 shall give eNB's 1 cell 3 CA data volume which needs to be divided by the time when CA data are sent for that cell.

Some embodiments of this invention provide an alternative to the rejected solution.

Namely, some embodiments of the invention provide a method for evaluation of the IP scheduled throughput, according to 3GPP TS 36.314, for CA UEs handled by inter eNB(s) CA feature which is done by measurement of the PDCP SDU volume, by determining the size of the PDCP SDU frames transmitted to CA UEs via PCell and all the activated SCells which are physically located in other eNB(s), and dividing it by time of E-RAB with data in the RLC buffer for CA UEs. In case of inter eNB(s) CA feature the UE is considered as having data in the RLC buffer if at least one of the involved RLC buffers, either in PCell or in at least one of the SCells physically located in other eNB(s), is not empty, excluding last TTIs emptying the buffer. Furthermore, it is assumed that SCell RLC buffer becomes not empty after PCell has started to transmit some data to SCell (before that activity no data were being transmitted from PCell to SCell) and that SCell RLC buffer becomes empty after last portion of the PDCP SDU (excluding last TTIs) has been successfully transmitted to UE.

According to some embodiments of the invention, the time the data spent in RLC buffer in the SCell of eNB2 (in the following description, PCell belongs to eNB1 and SCell belongs to eNB2) is estimated as:

$$T_{PDCP\ SDU_{iBuffer}} = \frac{PDCP\ SDU\ Volume_i}{IP\ Scheduled\ Throughput\ eNB2} \quad (1)$$

where PDCP SDU Volume is the volume of i-th PDCP SDU frame sent from PCell eNB1 to SCell eNB2, and IP Scheduled Throughput eNB2 as IP scheduled throughput measured according to 3GPP TS 36.314 and only for PDCP SDUs sent from eNB1 to eNB2 for inter eNB CA case. SCell can identify these PDCP SDUs because, for inter eNB CA, a unique X2 interface is established between each PCell and SCell. PDCP SDUs arrived on this X2 interface ("relevant PDCP SDUs") are to be taken into account for the measurement of the IP scheduled throughput in this case, and other PDCP SDUs are to be disregarded for the measurement.

Note that the measurement need not be performed separately over each burst of relevant PDCP SDUs. It may be performed over a part of a burst of relevant PDCP SDUs or over plural bursts (or parts of plural bursts) of relevant PDCP SDUs.

According to 3GPP TS 36.314, IP scheduled throughput is determined by measuring PDCP SDU volume transmitted to UE and dividing it by UE's total time with data in the RLC buffer, excluding both from numerator and denominator the portion related to last TTIs emptying the buffer. According to some embodiments of the invention, this principle is also kept for the inter eNB CA case. Considering parameters impacting the IP scheduled throughput it is therefore proposed according to some embodiments of the invention:

A. From the point of view of the PCell, to consider the SCell RLC buffer physically located in eNB2 to become not-empty at the point of time the PCell sends PDCP data to this SCell, regardless of the point in time the data are received in RLC layer of SCell. This proposal is driven by the fact that once some data are sent to SCell in eNB2, the end user expects their reception, i.e., they are acting like they would be counted in PCell RLC buffer in intra eNB CA. In case of start of a new burst when counting is started after first portion of data related to this burst is sent to UE, it is assumed that firstly PDCP data are to be considered for transmission in PCell and after that in SCell(s), i.e., that the determination of the point in time when a first portion of data related to this burst is sent to UE is done in PCell (a message exchange between PCell and SCell(s) is not needed to determine this first point in time). This point in time can be determined as the first point in time when data of the RLC buffer of PCell are removed.

B. Furthermore, it is considered that data are in the buffer when either PCell's RLC buffer or at least one of the RLC buffer of SCell(s) located in eNB2 has some data in it.

C. The time duration a given i-th PDCP SDU sent from PCell eNB (eNB1) to SCell eNB (eNB2) is in RLC buffer, as seen from PCell eNB1 perspective, is marked as $Total\_T_{PDCP\ SDU_{iBuffer}}$. It may be measured (determined) as follows:

$$Total\_T_{PDCP\ SDU_{iBuffer}} = T_{X2\_PDCP\ SDU_{iBuffer}} + T_{PDCP\ SDU_{iBuffer}} \quad (2)$$

where $T_{X2\_PDCP\ SDU_{iBuffer}}$ is time needed to travel from PCell eNB (eNB1) to SCell eNB (eNB2) via X2 interface ("link transmission delay") and $T_{PDCP\ SDU_{iBuffer}}$ is time data related to i-th PDCP SDU spent in RLC buffer in the SCell eNB2 (excluding portion related to last TTIs) ("transmission delay"). The latter may be measured as follows:

$$T_{PDCP\ SDU_{iBuffer}} = \frac{PDCP\ SDU\ Volume_i}{IP\ Scheduled\ Throughput\ eNB2} \quad (3)$$

where PDCP SDU Volume is the volume (data volume) of i-th PDCP SDU frame sent from PCell eNB1 to SCell eNB2, and IP Scheduled Throughput eNB2 as IP scheduled throughput measured according to 3GPP TS 36.314 measured in eNB2 and only for PDCP SDUs sent from eNB1 to eNB2 for inter eNB CA case.

D. As indicated above, a massive and frequent X2 message exchange between the PCell and SCell eNBs may not be feasible in some cases. Therefore, in some embodiments of the invention, equation 2 and equation 3 relay on averaged values of X2 transmission time and/or IP Scheduled Throughput eNB2.

IP Scheduled Throughput eNB2 may be communicated per a configurable time interval (e.g., 1 minute) from eNB2 to eNB1 via X2 interface and per the same (or another) time interval, the X2 transmission delay may be measured, too. The X2 message exchange can be thus decreased to 15 messages per measurement period of 15 minutes, considering 1 minute as configured time interval.

For example, the X2 transmission delay can be measured as RTT/2 related to X2 interface between eNB1 and eNB2, and RTT may be measured by ping procedure.

The measurement of IP Scheduled Throughput eNB2 in eNB2 and/or the measurement of the X2 transmission delay may be performed with the same period (time interval) as the reporting thereof. However, in some embodiments, plural measurements may be performed in the time interval and the plural measurements may be averaged for the reporting to eNB1. Also, in case of a single measurement of of IP Scheduled Throughput eNB2 per time interval, the time considered in the measurement may be the same as the time interval, or a shorter time duration within the time interval.

The above four points #A to #D have impact to 3GPP TS 36.314 where the related chapter 4.1.6.1 is proposed to be modified (in bold) as shown below:

4.1.6.1 Scheduled IP Throughput in DL

Protocol Layer: PDCP, RLC, MAC

| | |
|---|---|
| Definition | Scheduled IP Throughput in DL. Throughput of PDCP SDU bits in downlink for packet sizes or data bursts that are large enough to require transmissions to be split across several TTIs, by excluding transmission of the last piece of data in a data burst. Only data transmission time is considered, i.e., when data transmission over Uu has begun but not yet finished. For UEs in inter eNB Carrier Aggregation (CA) mode when PCell and SCell(s) physically located in different eNBs with dedicated RLC, MAC and physical layers when last piece of data may occur in each of that cell all such transmissions shall be excluded. Also, for UEs in inter eNB CA mode only data transmission time is considered which in this case means when data transmission over Uu has begun but not yet finished at least in one of the cells physically located in other eNB. Each measurement is a real value representing the throughput in kbits/s. The measurement is performed per QCI per UE. For successful reception, the reference point is MAC upper SAP. This measurement is obtained by the following formula for a measurement period: $$\text{If} \sum ThpTimeD1 > 0, \frac{\sum ThpVolD1}{\sum ThpTimeD1} \times 1000 [kbits/s]$$ If Σ ThpTimeD1= 0, 0 [kbits/s], where For small data bursts, where all buffered data is included in one initial HARQ transmission, ThpTimeDl = 0, otherwise ThpTimeDl = T1 − T2 [ms] Explanations of the parameters can be found in the table 4.1.6.1-1 below. |

TABLE 4.1.6.1-1

| | |
|---|---|
| ThpTimeDl | The time to transmit a data burst excluding the last piece of data transmitted in the TTI when the buffer or all the buffers for UEs in inter eNB CA mode are emptied. A sample of "ThpTimeDl" for each time the DL buffer for one E-RAB is emptied. |
| T1 | The point in time after T2 when data up until the second last piece of data in the transmitted data burst which emptied the PDCP SDU available for transmission for the particular E-RAB was successfully transmitted, as acknowledged by the UE. |
| T2 | The point in time when the first transmission begins after a PDCP SDU becomes available for transmission, where previously no PDCP SDUs were available for transmission for the particular E-RAB. |
| T1-T2 | For UEs in inter eNB CA mode this time difference shall be measured as time PDCP SDU need to travel on X2 interface from PCell to SCell eNB and time data of the particular PDCP SDU spent in the buffer of SCell eNB which shall be measured as volume of the PDCP SDU divided with IP Scheduled Throughput of SCell eNB (related to PDCP SDUs sent from PCell to SCell eNB in inter eNB CA case). In order to avoid an overload of X2 interface the IP Scheduled Throughput of SCell eNB is recommended to be reported from SCell to PCell eNB once per a configured interval (couple of minutes). |

TABLE 4.1.6.1-1-continued

| | |
|---|---|
| ThpVolDl | The volume of a data burst, excluding the data transmitted in the TTI when the buffer is emptied. For UEs in inter eNB Carrier Aggregation (CA) mode when PCell and SCell(s) physically located in different eNBs with dedicated RLC, MAC and physical layers when last piece of data may occur in each of that cell all such transmissions shall be excluded. A sample for ThpVolDl is the data volume, counted on PDCP SDU level, in kbits successfully transmitted (acknowledged by UE) in DL for one E-RAB during a sample of ThpTimeDl. It shall exclude the volume of the last piece of data emptying the buffer. |

Figure 2:
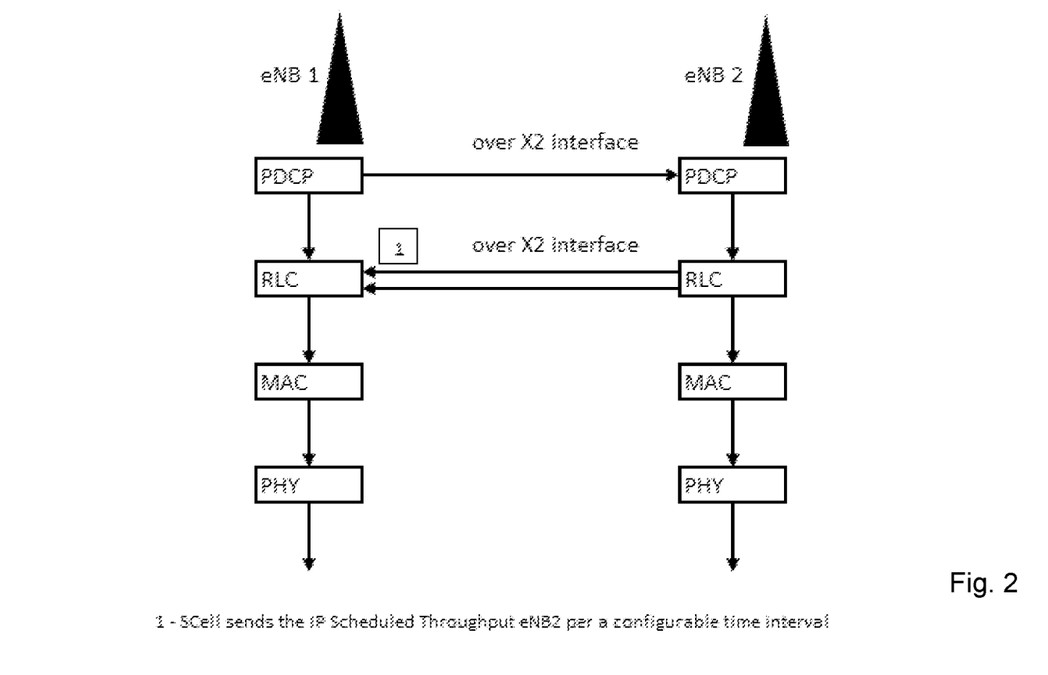
FIG. 2 shows a principle of a method according to some embodiments of the invention based on SCell's reported IP scheduled throughput.

The principle of the method from implementation point of view is shown in FIG. 2. As explained in above point #B, after PCell sends data to SCell for CA, RLC layer of the SCell(s) does not inform PCell via X2 interface (with the timestamp) each time the SCell RLC buffer becomes empty. Rather, SCell only informs PCell on its relevant IP scheduled throughput. Such confirmation mechanism may be performed for each user separately.

Figure 3:
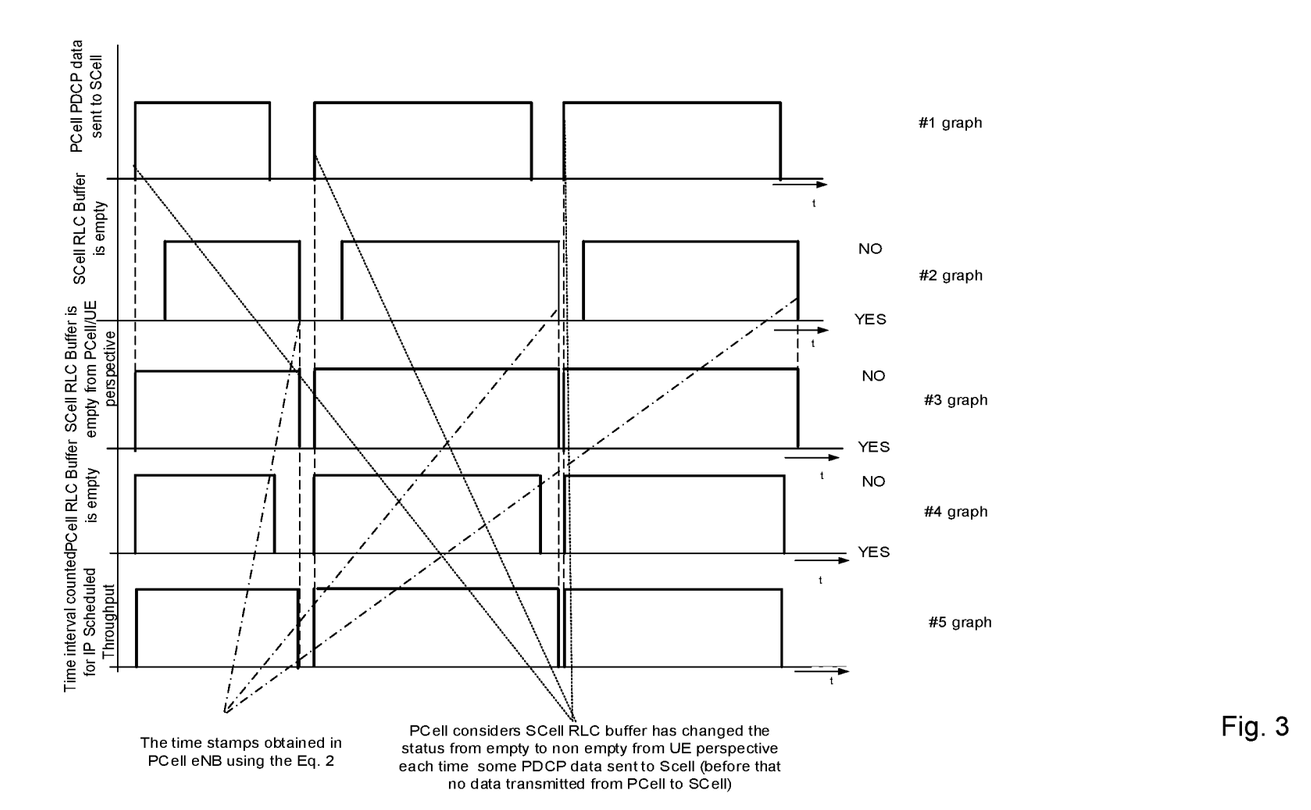
FIG. 3 shows an example of the method according to some embodiments of the invention.

FIG. 3 shows an example of an embodiment of the invention with one CA UE only and one SCell located in another eNB than the PCell. Related to point #A above, the PCell eNB considers the SCell RLC buffer as not-empty from the point of time the PCell sends PDCP data to this SCell (see graph #1 in FIG. 3), regardless what is the actual point in time the data are received in RLC SCell layer (see graph #2 in FIG. 3). On the other hand, PCell eNB considers the SCell RLC buffer to be empty at the point of time obtained from the timestamp using the Equation (2). Graph #3 in FIG. 3 shows when the SCell RLC Buffer from PCell/UE perspective is empty and not-empty, respectively. In relation to point #B above, PCell eNB then provides final graph #5 in FIG. 3, where the time interval is determined when there are data in the respective buffer of any of the CA Cells. The graph #5 is obtained by an "OR function" applied to "graph #3" in FIG. 3 and "graph #4" in FIG. 3 (where graph #4 in FIG. 3 shows whether or not the PCell RLC buffer is empty).

The method according to some embodiments of the invention is beneficial, because it keeps the logic of IP scheduled throughput unchanged from the end user perspective, compared with the basic definition of this measurement in 3GPP TS36.314. It also keeps a number of extra messages needed for this method on X2 interface on a low level. Even in some extreme case where such loading of X2 interface is not allowed at all, the X2 reporting for the IP Scheduled Throughput eNB2 may be completely skipped, and as configured time interval the measurement reporting interval (15 minutes a default) is used considering that IP Scheduled Throughput eNB2 is communicated from $3^{rd}$ party tools (containing PM data from this measurement period) to PCell eNB1. Regarding the communication of the IP Scheduled Throughput eNB2 as an average value per a configurable time interval (e.g., 1 minute) from eNB2 to eNB1 via X2 interface and not per each burst follows the logic how IP scheduled throughput is defined in 3GPP TS 36.314, which is an averaged throughput. It is assumed that the averaging does not severely impact the precision of the obtained throughput values.

Figure 4:
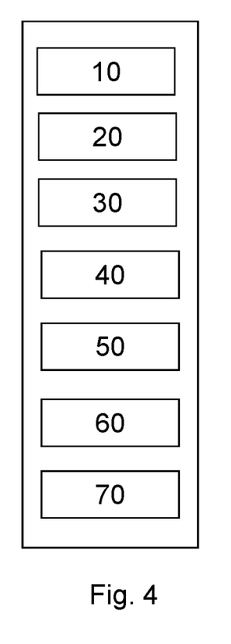
FIG. 4 shows an apparatus according to an embodiment of the invention.
Figure 5:
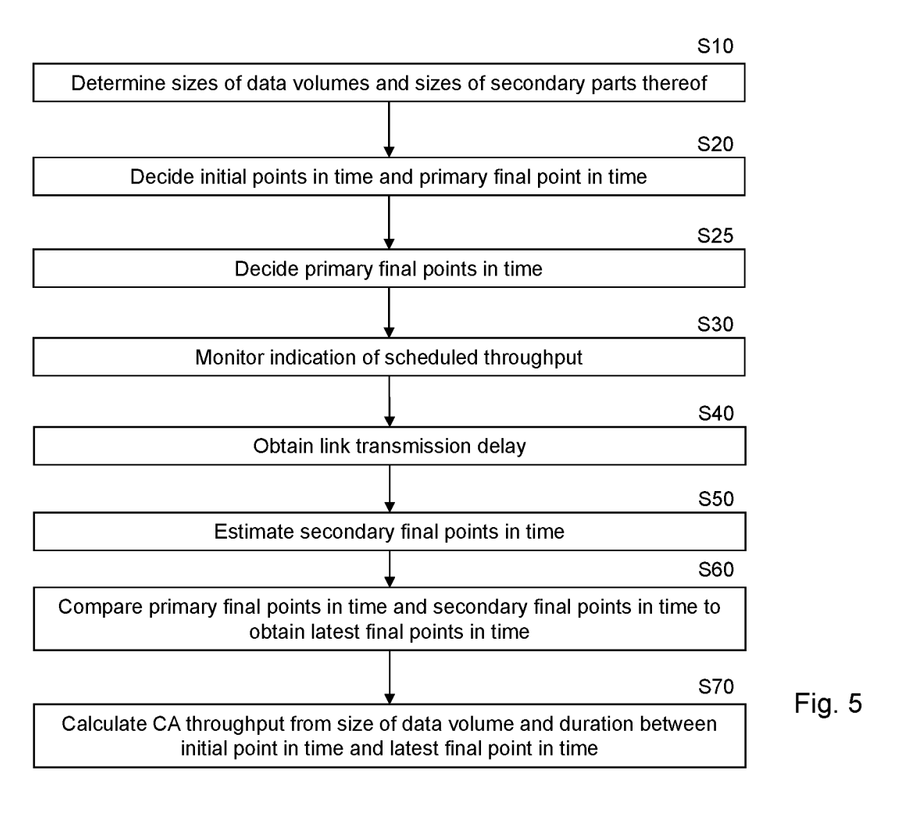
FIG. 5 shows a method according to an embodiment of the invention.

FIG. 4 shows an apparatus according to an embodiment of the invention. The apparatus may be a base station such as a eNB or gNB or cell thereof such as a primary serving cell, or an element thereof. FIG. 5 shows a method according to an embodiment of the invention. The apparatus according to FIG. 4 may perform the method of FIG. 5 but is not limited to this method. The method of FIG. 5 may be performed by the apparatus of FIG. 4 but is not limited to being performed by this apparatus.

The apparatus comprises means for determining 10, means for deciding 20, means for monitoring 30, means for obtaining 40, means for estimating 50, means for comparing 60, and means for calculating 70. The means for determining 10, means for deciding 20, means for monitoring 30, means for obtaining 40, means for estimating 50, means for comparing 60, and means for calculating 70 may be a determining means, deciding means, monitoring means, obtaining means, estimating means, comparing means, and calculating means, respectively. The means for determining 10, means for deciding 20, means for monitoring 30, means for obtaining 40, means for estimating 50, means for comparing 60, and means for calculating 70 may be a determiner, decider, monitor, obtainer, estimator, comparer, and calculator, respectively. The means for determining 10, means for deciding 20, means for monitoring 30, means for obtaining 40, means for estimating 50, means for comparing 60, and means for calculating 70 may be a determining processor, deciding processor, monitoring processor, obtaining processor, estimating processor, comparing processor, and calculating processor, respectively.

The means for determining 10 determines (S10):
a size of a first data volume received at a primary cell;
a size of a secondary part of the first data volume;
a size of a second data volume received at the primary cell;
a size of a secondary part of the second data volume.

The first data volume and the second data volume are to be transmitted to a terminal. The second data volume is different from the first data volume. The secondary parts of the first and second data volumes are transmitted on a link from the primary cell (PCell) to a secondary cell (SCell) for transmission to the terminal. For example, the primary cell and the secondary cell may act in carrier aggregation for the terminal.

The means for deciding 20 decides a first initial point in time when the transmission of the first data volume to the terminal starts and a second initial point in time when the transmission of the second data volume to the terminal starts (S20). Furthermore, the means for deciding 20 decides a first primary final point in time and a second primary final point in time (S25). The first and second primary final points in time are decided based on an end of the transmission of the primary part of the respective data volume from the primary cell to the terminal (i.e., directly from the PCell via an air interface to the terminal).

The sequence of S10 and S20 is arbitrary for each of the first data volume and the second data volume. They may be performed fully or partly in parallel.

The means for monitoring 30 monitors if an indication of a scheduled throughput of the secondary cell is received (S30). The means for obtaining 40 obtains a link transmission delay on the link from the primary cell to the secondary cell (S40).

The sequence of S30 and S40 is arbitrary. They may be performed fully or partly in parallel. Also, each of S30 and S40 may be performed in an arbitrary temporal relationship to S10, S20, and S25.

The means for estimating 50 estimates first and second secondary final point in time based on the respective initial point in time (decided by the means for deciding 20), the link transmission delay (obtained by the means for obtaining 40), the size of the secondary part of the respective data volume (determined by the means for determining 10), and the indication of the scheduled throughput (monitored by the means for monitoring 30) (S50). At least one of the scheduled throughput and the link transmission delay is the same for the first data volume and the second data volume.

For each of the first data volume and the second data volume, the means for comparing 60 compares the respective primary final point in time with the respective secondary final point in time. Thus, the means for comparing identifies respective latest final points in time among the respective primary and secondary final points in time (S60).

For each of the first data volume and the second data volume, the means for calculating 70 calculates a respective throughput of the transmission of the data volume to the terminal based on a size of the respective data volume and a time duration between the respective initial point in time and the respective latest final point in time (S70). In particular, the means for calculating may calculate the respective throughput as a quotient of the respective data volume and the time duration between the respective initial point in time and the respective latest final point in time.

Figure 6:
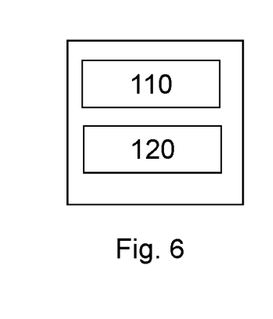
FIG. 6 shows an apparatus according to an embodiment of the invention.
Figure 7:
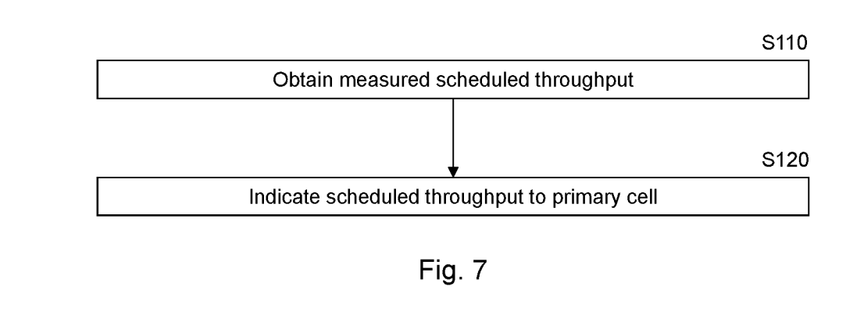
FIG. 7 shows a method according to an embodiment of the invention.

FIG. 6 shows an apparatus according to an embodiment of the invention. The apparatus may be a base station such as a eNB or gNB or cell thereof such as a secondary serving cell, or an element thereof. FIG. 7 shows a method according to an embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises means for obtaining 110, and means for providing 120. The means for obtaining 110, and means for providing 120 may be an obtaining means, and providing means, respectively. The means for obtaining 110, and means for providing 120 may be an obtainer, and provider, respectively. The means for obtaining 30, and means for providing 40 may be an obtaining processor, and providing processor, respectively.

The means for obtaining 110 obtains a measured scheduled throughput of a scheduling of a transmission of a data volume from a secondary cell to a terminal (S110). The measured scheduled throughput is related to only the data volume scheduled for transmission from the secondary cell to the terminal and received by the secondary cell from a primary cell for the transmission to the terminal.

The means for providing 120 provides an indication of an indicated scheduled throughput to the primary cell (S120). The indicated scheduled throughput is based on the measured scheduled throughput. For example, the indicated scheduled throughput may be the same as the measured scheduled throughput, or the indicated scheduled throughput may be an averaged scheduled throughput, wherein the averaging may be performed over plural measurements performed in a predefined period of time.

Figure 8:
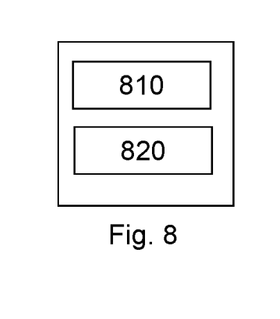
FIG. 8 shows an apparatus according to an embodiment of the invention.

FIG. 8 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform the method according to one of FIGS. 5 and 7.

In some embodiments, half of the round trip time is considered for the link transmission delay. However, in some embodiments, other fractions of the round trip time may be used, e.g., if the link is asymmetric such that transmission in one direction is faster than in the other direction.

In some embodiments, SCell informs PCell on its relevant IP scheduled throughput with a fixed period. In other embodiments, SCell may inform PCell on its relevant IP scheduled throughput if a certain event occurs (e.g., if a certain amount of PDCP SDUs are received over the X2 interface for a CA UE or for all CA UEs of the Scell). The criteria may be combined. E.g., SCell informs PCell after the amount of PDCP SDUs has received or after the time interval has elapsed in case the received amount PDCP SDUs is not sufficient. If a new measurement has not been performed when the amount of received PDCP SDUs is sufficient, SCell may report the value of the previous measurement.

In some embodiments, PCell may modify the CA configuration depending on the calculated throughput of the transmission. For example, if the calculated throughput is lower than expected, it may select another SCell. As another example, if the calculated throughput is higher than expected, PCell may remove one or more SCells from the set of SCells configured for the UE. PCell may change some radio parameters in dependence of the calculated throughput.

In some embodiments, PCell may estimate the duration while the PDCP SDU remain in the buffer of an SCell by a modified relationship of data volume (at SCell) and IP scheduled throughput (at SCell). For example, a factor may take into account some packet loss on X2 interface. Another factor may represent some margin because the actual IP scheduled throughput may be different from the IP scheduled throughput indicated by SCell. Instead of or in addition to a factor, an additive term may be adopted.

Correspondingly, in some embodiments, the calculated throughput of CA may result from a modified relationship of (total) data volume and estimated duration. For example, the duration may be extended by some time needed for internal processing in PCell before data for SCell are sent on X2 link and/or internal processing in SCell after arrival of the data on X2 link. Another additive term may represent some margin for the estimation. Instead of or in addition to an additive term, a factor may be adopted.

Some embodiments of the invention are described which are based on E-UTRAN. However, the invention is not limited to E-UTRAN and may be applied to UTRAN or forthcoming radio access technologies such as NR. In NR, a gNB corresponds to a eNB of E-UTRAN.

The maximum number of SCells per UE is not generally limited to 4. According to some embodiments of the invention, the maximum number may be larger or smaller than 4, or the number of SCells may be unlimited.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a base station (such as a gNB or eNB) or a cell (such as a primary cell or a secondary cell) thereof, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus comprising:
at least one processor; and
at least one memory including instructions,
wherein the at least one processor, with the at least one memory and the instructions, is arranged to cause the apparatus at least to:
determine a size of a data volume and a size of a secondary part of the data volume;
determine an initial time point when a transmission of the data volume starts based on a start of a transmission of a primary part of the data volume and a primary final time point when the transmission of the primary part of the data volume ends;
estimate a secondary final time point based on the initial time point and the size of the secondary part of the data volume;
compare the primary final time point with the secondary final time point to identify a latest final time point; and
calculate a throughput of the transmission of the data volume based on the size of the data volume and a time duration between the initial time point and the latest final time point.

2. The apparatus according to claim 1, wherein the data volume is received at a primary cell and to be transmitted to a terminal.

3. The apparatus according to claim 1, wherein the secondary part of the data volume is transmitted on a link from a primary cell to a secondary cell for a transmission to a terminal.

4. The apparatus according to claim 3, wherein the at least one processor is further arranged to cause the apparatus to:
obtain a link transmission delay on the link from the primary cell to the secondary cell,
wherein the secondary final time point is estimated based on the link transmission delay, the initial time point and the size of the secondary part of the data volume.

5. A method comprising:
determining a size of a data volume and a size of a secondary part of the data volume;
determining an initial time point when a transmission of the data volume starts based on a start of a transmission of a primary part of the data volume and a primary final time point when the transmission of the primary part of the data volume ends;
estimating a secondary final time point based on the initial time point and the size of the secondary part of the data volume;
comparing the primary final time point with the secondary final time point to identify a latest final time point; and
calculating a throughput of the transmission of the data volume based on the size of the data volume and a time duration between the initial time point and the latest final time point.

6. The method according to claim 5, wherein the data volume is received at a primary cell and to be transmitted to a terminal.

7. The method according to claim 6, wherein the secondary part of the data volume is transmitted on a link from a primary cell to a secondary cell for a transmission to a terminal.

8. The method according to claim 7, further comprising:
obtaining a link transmission delay on the link from the primary cell to the secondary cell,
wherein the secondary final time point is estimated based on the link transmission delay, the initial time point and the size of the secondary part of the data volume.

9. A non-transitory computer readable medium comprising instructions that, when executed by an apparatus, cause the apparatus at least to:
determine a size of a data volume and a size of a secondary part of the data volume;
determine an initial time point when a transmission of the data volume starts based on a start of a transmission of a primary part of the data volume and a primary final time point when the transmission of the primary part of the data volume ends;
estimate a secondary final time point based on the initial time point and the size of the secondary part of the data volume;
compare the primary final time point with the secondary final time point to identify a latest final time point; and
calculate a throughput of the transmission of the data volume based on the size of the data volume and a time duration between the initial time point and the latest final time point.

10. The non-transitory computer readable medium according to claim 9, wherein the data volume is received at a primary cell and to be transmitted to a terminal.

11. The non-transitory computer readable medium according to claim 9, wherein the secondary part of the data volume is transmitted on a link from a primary cell to a secondary cell for a transmission to a terminal.

12. The non-transitory computer readable medium according to claim 11, wherein non-transitory computer readable medium further comprises instructions that cause the apparatus to:
   obtain a link transmission delay on the link from the primary cell to the secondary cell,
   wherein the secondary final time point is estimated based on the link transmission delay, the initial time point and the size of the secondary part of the data volume.

* * * * *